Figure 1:
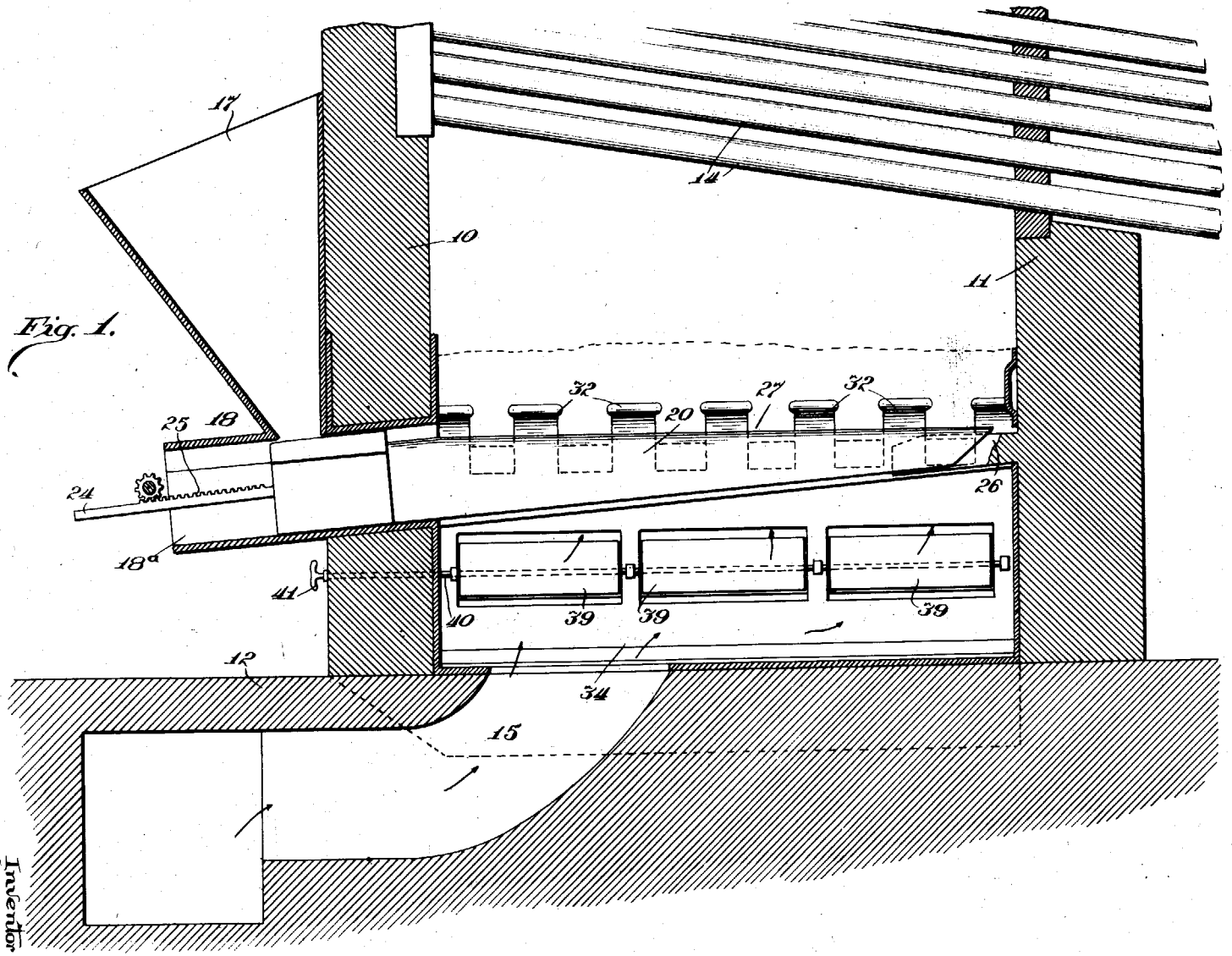

H. E. KLEFFEL.

MECHANICAL STOKER.

APPLICATION FILED SEPT. 18, 1919.

Reissued Nov. 4, 1919.

14,747.

4 SHEETS—SHEET 1.

Inventor

Harrison E. Kleffel

By

Rector Ashburn Davis & Macauley

Attorneys.

H. E. KLEFFEL.

MECHANICAL STOKER.

APPLICATION FILED SEPT. 18, 1919.

Reissued Nov. 4, 1919.

14,747.

4 SHEETS—SHEET 2.

Inventor

Harrison E. Kleffel

By

Rector, Ribben, Davis & Macauley

Attorneys.

H. E. KLEFFEL.
MECHANICAL STOKER.
APPLICATION FILED SEPT. 18, 1909.
Reissued Nov. 4 1919.
14,747.
4 SHEETS—SHEET 3.
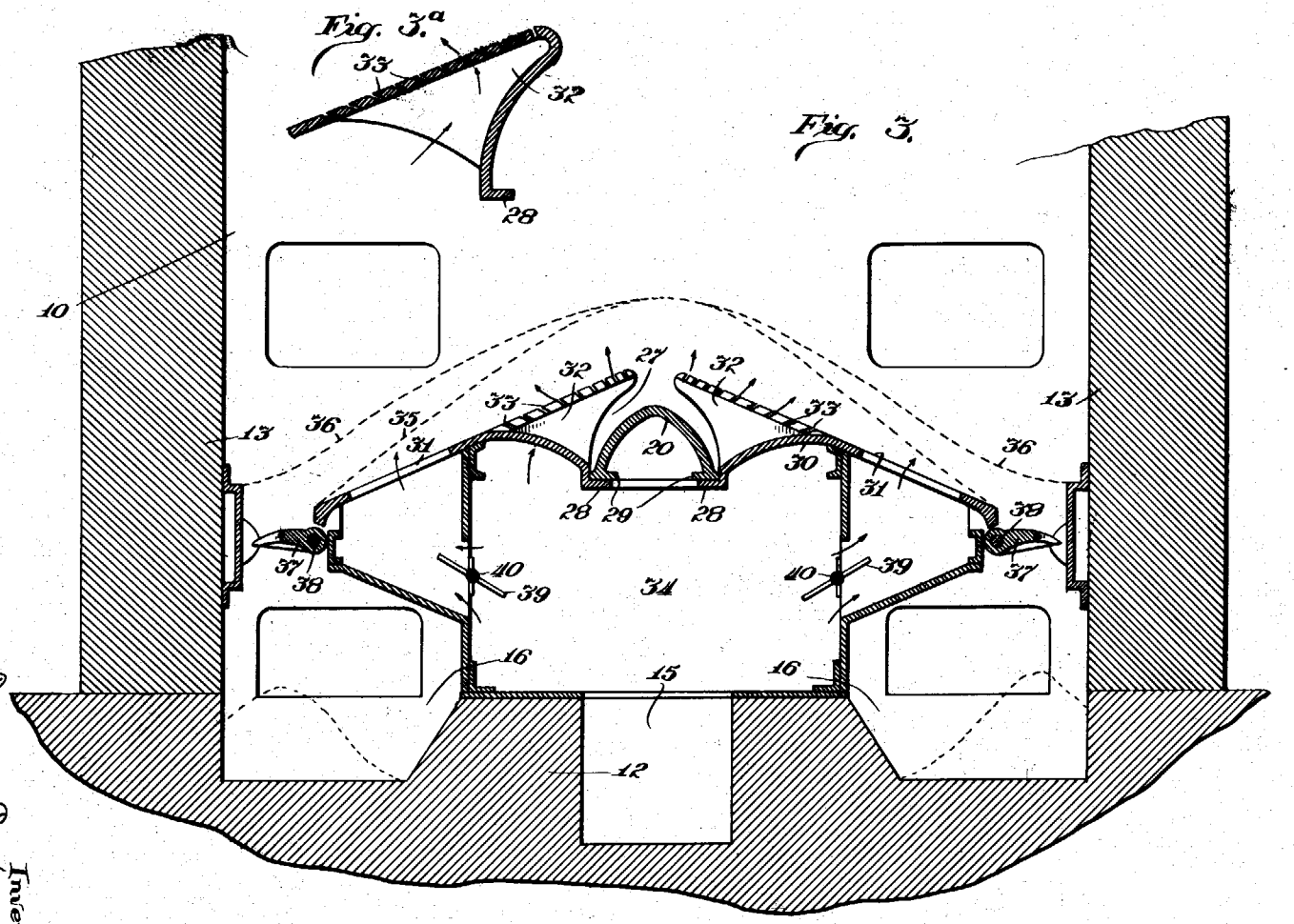
Inventor
Harrison E. Kleffel
By
Rector, Sibley, Davis & Massey
Attorneys H. E. KLEFFEL.
MECHANICAL STOKER.
APPLICATION FILED SEPT. 19, 1919.
Reissued Nov. 4, 1919.
14,747.
4 SHEETS—SHEET 4.
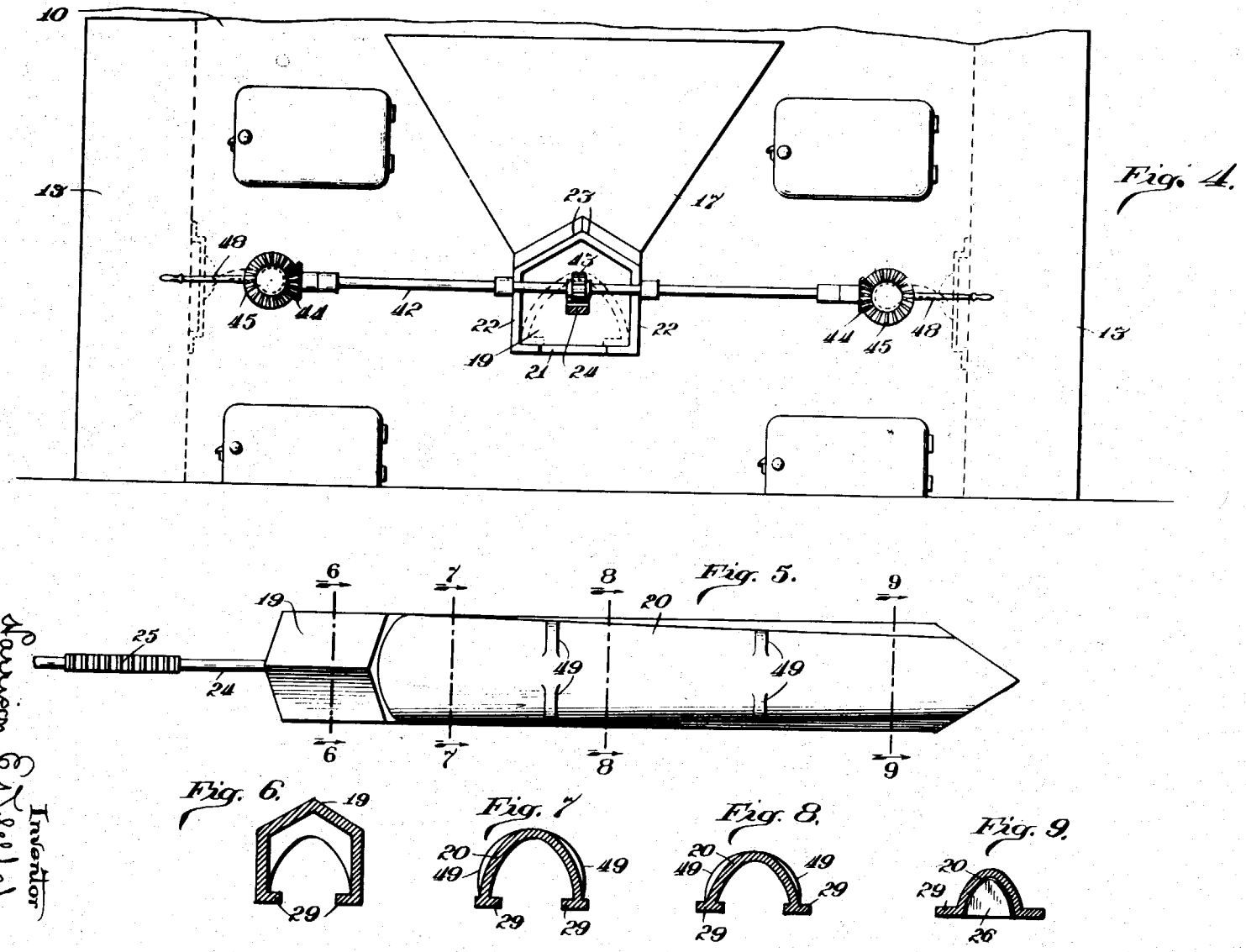
Inventor
Harrison E. Kleffel
By Rector, Sibley, Davis & Marcalus
Attorneys

UNITED STATES PATENT OFFICE.

HARRISON E. KLEFFEL, OF NEW YORK, N. Y., ASSIGNOR TO THE UNDER-FEED STOKER COMPANY OF AMERICA, OF DETROIT, MICHIGAN, A CORPORATION OF NEW JERSEY.

MECHANICAL STOKER.

14,747. Specification of Reissued Letters Patent. Reissued Nov. 4, 1919.

Original No. 1,270,171, dated June 18, 1918, Serial No. 202,374, filed November 16, 1917. Application for reissue filed September 18, 1919. Serial No. 324,694.

*To all whom it may concern:*

Be it known that I, HARRISON E. KLEFFEL, a citizen of the United States, and a resident of the city of New York, borough of Manhattan, in the county and State of New York, have invented a new and Improved Mechanical Stoker, of which the following is a specification.

This invention relates to steam-boiler or similar furnaces and has particular reference to mechanical stokers. Underfeed stokers are widely used, for relatively small installations, in which the green coal is ram-fed from a single hopper into and along a single longitudinal retort, having its mouth or top substantially horizontally disposed, the burning coal being distributed laterally from the retort, by gravity or by movement of lateral feed parts, across the retort-flanking floor-surfaces—either dead plates or grates—which slope down and toward the side-walls; ash removal being effected near the side walls. In some respects my invention relates especially to this general class of single-retort stokers and it has among its objects to improve the fuel distributive action and means therefor and the resultant functioning of the stoker.

Another object of the invention is to improve the connections between the feeder mechanism and the movable grate devices whereby both sets of these devices may be operated simultaneously and from a single source of power.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 2:
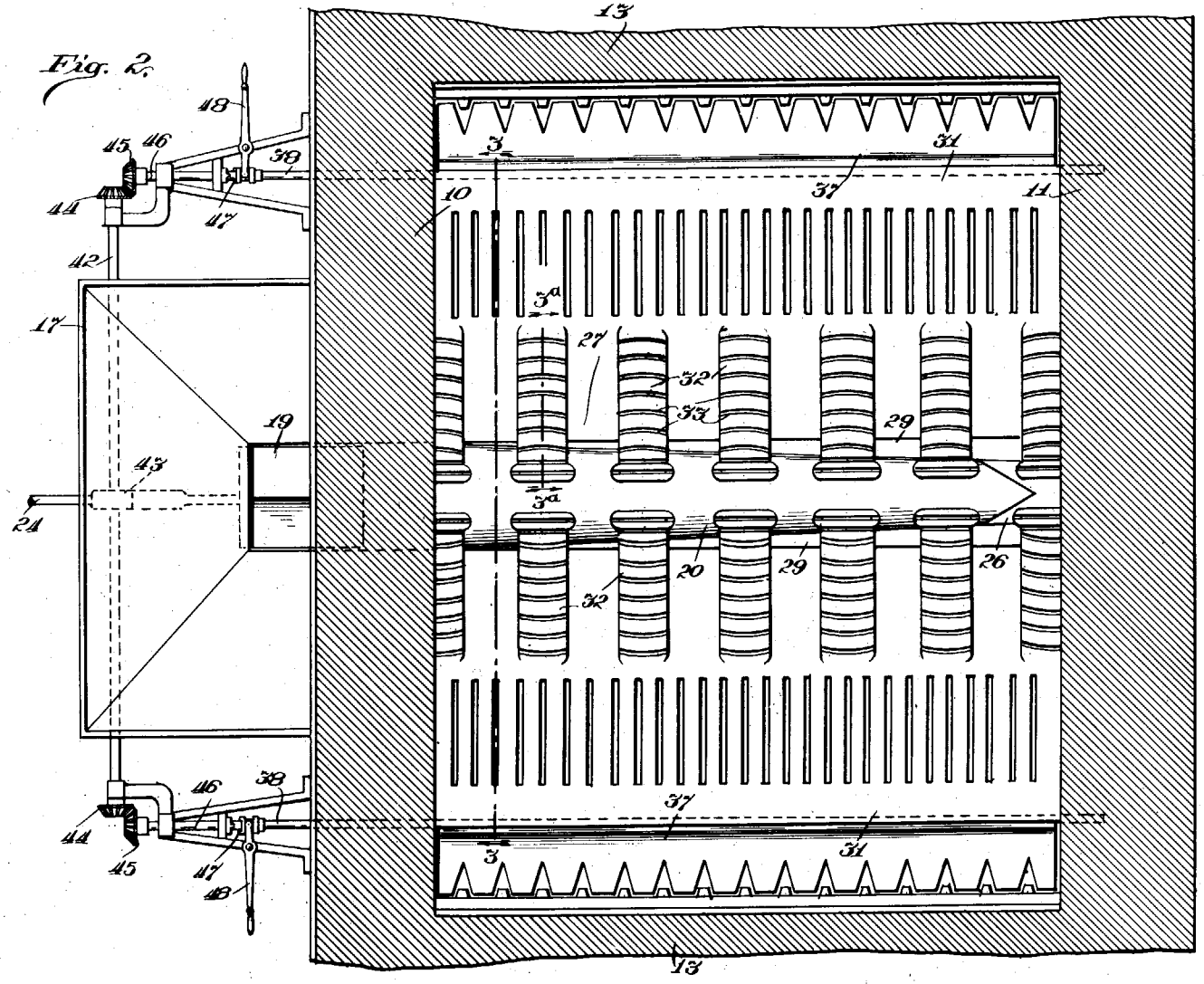

Figure 1 is a vertical central longitudinal section indicating my improved device; Fig. 2 is a plan view; Fig. 3 is a vertical transverse section approximately on the line 3—3 of Fig. 2; Fig. 3ª is a sectional detail on the line 3ª—3ª of Fig. 3; Fig. 4 is a front elevation. Fig. 5 is a plan view of the plunger; and Figs. 6 to 9 are transverse sectional details on the corresponding lines of Fig. 5.

Referring now more particularly to the drawings I indicate as an illustration of the preferred embodiment of my invention, its application to a standard form of steam boiler furnace having a front wall 10, a rear wall 11, a base or floor 12, side walls 13, a series of water tubes 14, a fresh air channel 15 along the center of the base and ash pits 16 at the sides.

At the front of the furnace is arranged an open topped hopper 17 from or through which the fuel is fed or delivered into the fire pot. The bottom of the hopper communicates with the fuel-channel, which comprises a ram-casing or tubular-member 18, a main longitudinal retort 27, and lateral-branch retorts 30. These retort-elements form parts of the fire-box floor that, preferably, has its longitudinal surfaces in horizontal lines (Fig. 1), but that laterally down-slopes on both sides from the main-retort mouth toward the side walls 13 (Fig. 3). The tubular member 18 may be regarded as comprising a throat portion 18ª having an open outer end in which is fitted a feeder block or ram portion 19 of a rigid plunger having a long tapered tongue portion 20 within the furnace. The throat portion 18ª is indicated as comprising a plain bottom 21, vertical side walls 22 and an angularly shaped top or roof portion 23. This roof portion as well as the sides and bottom projects through the front wall 10 and is unbroken except where the lower end of the hopper communicates therewith. The feeder block 19 conforms in shape and size to the inner surface of the throat portion 18ª in which it is adapted to be reciprocated by any suitable power devices, not shown, but communicated thereto through a shank 24 having a series of rack teeth 25 formed thereon. The tongue portion 20 of the plunger is tapered toward the rear end, the upper surface of the tongue being substantially horizontal while the bottom of the tongue is inclined upwardly toward the rear providing the taper in a vertical direction, while the side walls and tongue converge toward the rear constituting the taper thereon in a transverse horizontal direction. The extreme rear end of the tongue is V-shaped or pointed and is preferably supported upon a V-shaped guide block 26. It will be noted from Fig. 1 that the bottom edge or surface of the tongue 20 is in alinement with the bottom portion of the throat 18[a] and hence is parallel to the axis of the shank 24. The vertical taper of the tongue therefor corresponds substantially to the upward inclination of the bottom of the fuel channel. It will be seen therefore that when the plunger is moved forwardly bringing the rear end of the block 19 in front of the outlet from the hopper to admit a quantity of coal into the fuel channel the top surface of the tongue will approach the bottom of said channel. Furthermore when the plunger is forced rearwardly and upwardly the block 19 will act positively against the mass of coal admitted behind it and force the same rearwardly through the throat 18[a] and at the same time the tongue will be lifted while it glides rearwardly and upwardly along the inclined bottom of the fuel channel, and thus the coal, in repeated reciprocations of the plunger, will be forced upwardly due to the rise of the plunger and rearwardly and laterally through the distributing retorts or channels due to the rearward taper of the plunger. The degree of taper will, of course, be designed according to the length of the fire box and the degree of inclination of the fuel channel.

The guide block 26 supporting the rear pointed end of the tongue 20 serves to hold the plunger from lateral vibration and more particularly serves to prevent the fuel from working beneath the rear end of the tongue.

The main retort or fuel channel is shown best in Fig. 3 and constitutes a longitudinal gutter-like structure 27, the bottom of which comprises only a pair of guide rails 28 supporting the tongue 20 having bearing flanges 29. The reciprocating tongue therefore constitutes the real bottom of the fuel channel or retort 27. These flanges, as shown in Fig. 2, are approximately parallel at their outer edges and serve to hold the coal from dropping through the space between the rails 28. Laterally of the rails the bottom of the fuel channel extends upwardly and merges along the rounded lines of the bottoms of lateral branch retorts 30 into the downwardly inclined side-grates or fuel supporting walls 31. It will be noted that while the top surface of my tongue or plunger 20 is horizontal and always parallel to the top of the main retort the upward and rearward taper of the plunger provides that the cross-sectional area of the retort is substantially the same at all points throughout its length, and yet its sides are approximately parallel.

Draft trunks 32 intervene between, and form the side-walls of, the several lateral retorts 30, and at their higher inner ends (which form the interrupted side-walls of the main retort 27) they project well upward and inward toward the vertical central plane of the retort, as shown in Figs. 3 and 3[a]. Such construction tends to aid the feed-tongue in effecting a force feed along the lateral retort-branches and also brings the air-trunks well toward the middle of the furnace-floor so as to supply ample air to the median zone of the fire. The top of each of these air trunks 32 is provided with outwardly inclined slits or twyers 33, the planes of the several slits of each trunk being arranged fan-shaped or toward the vertical at the upper or central end of each trunk. Air is admitted freely through the bottom of the trunks from the main central air chamber 34 communicating with the draft channel 15. Portions of the coal pushed upwardly and laterally by the tongue 20 of the plunger pass upwardly between adjacent trunks 32 of the same series. Thus the fuel is formed into a relatively thin bed extending over the fuel channel, air trunks and slotted grate walls 31 approximating the form indicated by the dotted line 35 in Fig. 3. Throughout its progress through the main and branch retorts the green fuel receives air above its bottom layer, so that active combustion takes place above the green coal in accordance with well known "underfeed" principles. Before it reaches the grate surfaces 31 the entire coal body, being worked out through the lateral retorts of progressively-decreasing depth, will be ignited, and before the fuel reaches the ash dumps it will be substantially burned out. The ashes or other solid products of combustion accumulate laterally of the mound of fuel approximating the form indicated at 36. These products of combustion may be delivered downwardly into the ash pits 16 by operation of the movable ash-dumps or shaking grate bars 37 mounted upon shafts 38 journaled longitudinally of the furnace along or near the side walls thereof. The side walls of the air chamber 34 are provided with any suitable character of draft regulators 39 mounted upon shafts 40, each having a handle, or its equivalent, at 41 at the front end of the furnace to control the position thereof, so that the draft to the grates may be cut down without lessening the draft to the retort twyers.

For the purpose of operating the movable ash dumps 37 mechanically and automatically, I provide a rock shaft 42 journaled transversely across the front of the furnace and having a pinion 43 meshing with the rack teeth 25 above described. At each reciprocation of the shank 24 the teeth thereof will rotate the rock shaft 42. At the ends of the rock shaft are beveled gears 44 meshing with corresponding gears 45 secured to the front ends of short shafts 46 arranged in axial alinement with the grate shafts 38 and adapted to be clutched thereto by any suitable type of clutch indicated generally at 47 and each under the control of the operator through a hand lever 48. If the movable dump bars 37 are to be operated at each reciprocation of the plunger obviously the clutches 47 will be held connecting the shafts 38 and 46, but if either of the grate bars is to be stopped the operator will shift the clutch accordingly but without interfering with the action of the plunger and feeder block thereon.

Referring again to the plunger shown in detail in Figs. 5 to 9 it will be observed that the rear end of the block 19 where it projects above the tongue portion 20 abuts squarely against the body of coal received from the hopper and hence this portion of the feeder block acts positively to force the coal into or toward the furnace. Irrespective, therefore, of the condition of the coal in the fuel channel 27 each time the block 19 is reciprocated forwardly there will be an additional amount of coal received back of the ram or block 19 and on the next rearward reciprocation the bulk of this coal just received will be forced rearwardly, pushing in turn any previously admitted coal back or above it. Even though the top surface of the tongue is not inclined downwardly toward the rear the coal will nevertheless be moved rearwardly due to the ram action and to the lateral taper of the tongue. As indicated at 49 I may provide fins or ribs extending transversely across or along the upper curved surface of the tongue which will serve not only to strengthen and stiffen the tongue, but also as positive pushing means to facilitate the rear distribution of the coal.

The extension, laterally, of the area over which the coal is underfed, as a result of the provision of lateral branch retorts, is intended to and does give my stoker a greatly increased fuel-consumption rate as compared with prior single-retort stokers. A larger quantity of coal may be handled by the stoker; coking and gas-consumption are expedited, and the supply of twyer-fed air is greatly augmented. The green coal may be spread to a rather uniform depth and in a rather shallow bed throughout this laterally enlarged retort area. All these factors contribute to the greatly beneficial results that low grade fuels may be burned effectively; that my stokers may be commercially built in sizes to serve larger boiler units than the usual central-retort stokers could practically take care of; and that foot for foot of fire box area my stoker attains such increase of consumption-rate as enables the furnace to meet very heavy and sustained boiler-overloads.

More specifically the tongue-equipped feed-ram offers advantage in its simplicity and certainty of operation, and enables the whole feed to be effected by a single solid reciprocating part. Further, the rise and fall of the top surface of the tongue acts forcefully to keep the fire properly broken up for air-passage, and to prevent formation of large clinkers along the retort-walls.

I claim:

1. In a mechanical stoker, the combination of a grate structure having a central retort, the top of which is horizontal and the bottom of which is provided with upwardly and rearwardly inclined flanges but being otherwise open, and a plunger arranged in said retort whose top is parallel to the top of the retort and whose bottom is upwardly inclined and coöperating with said flanges constitutes the real bottom for the retort.

2. In a mechanical stoker, the combination of a retort having rigid walls and a top arranged in a horizontal plane but whose bottom is open, and a reciprocating plunger in said retort, the top of the plunger being parallel to the top of the retort while the bottom thereof is inclined upwardly and rearwardly and constitutes the closure for the retort bottom.

3. In a mechanical stoker, the combination of a suitably arranged retort from which extend laterally a plurality of branch retorts the tops of which are in substantially the same horizontal plane, the walls between the adjacent branch retorts constituting air trunks, and a reciprocating plunger in the main retort serving when reciprocated to convey the coal upward and rearward along the main retort and laterally from the main retort into the branch retorts.

4. In a mechanical stoker, the combination of a rigid grate construction provided with a central retort from the opposite sides of which extend series of branch retorts, the top of the wall structures between adjacent retorts of the same series being hollow constituting air trunks and having their tops extended upward and inward toward the vertical central plane of the main retort, and a reciprocating plunger in the main retort, the top of the plunger being parallel to the tops of said trunks, while the bottom thereof is upwardly and rearwardly tapered whereby the top of the plunger will be moved toward and from the plane of the tops of the trunks coincidentally with the reciprocations thereof.

5. In a mechanical stoker, the combination of a rigid grate structure including a main retort from which extend a series of lateral branch retorts, the wall structure between adjacent branch retorts constituting air trunks the tops of which lie in the same horizontal plane, and a plunger in the main retort, the bottom of the plunger being upwardly and rearwardly inclined whereby the plunger is lifted at each rearward reciprocation while the top of the plunger is horizontal and hence always parallel to the horizontal plane aforesaid irrespective of the vertical distance below it.

6. In a mechanical stoker, the combination of a grate structure comprising a main retort from which extend laterally a series of branch retorts, the wall structures between adjacent branch retorts constituting air trunks which extend upward and inward toward the central plane of the main retort, the top surface of each of said trunks being provided with transverse slits arranged in a series of fan shaped planes, the uppermost slits lying in planes nearest vertical, and a reciprocating plunger located in the main retort, said plunger being tapered rearwardly whereby at each rearward reciprocation thereof coal will be forced upward and rearward along the main retort and laterally into and through the branch retorts, the distribution being substantially equal in all directions.

7. In a mechanical stoker, the combination of a rigid grate structure having a main retort with substantially parallel side walls and open bottom defined by parallel upwardly inclined supporting flanges, said side walls being broken and establishing communication between the main retort and a series of branch retorts on each side of the main retort, the walls between adjacent branch retorts constituting upwardly projecting air trunks the tops of which are in the same horizontal plane, and a plunger reciprocating in the main retort, said plunger having a substantially straight upper surface parallel to said horizontal plane while the bottom thereof is inclined upwardly and rearwardly, the body portion of the plunger being tapered rearwardly and yet provided with parallel edge flanges cooperating with said supporting flanges.

8. In a mechanical stoker, the combination with a main fixed grate having a central retort and a series of branch retorts extending laterally therefrom on either side, the top of the grate along the main retort being horizontal but inclined laterally therefrom along the branch retorts, a movable dumping grate member along the bottom edge of each inclined portion of the grate, a reciprocating plunger in the main retort serving to convey the fuel upward and rearward along the same and simultaneously laterally along the branch retorts, and means to mechanically operate the movable grate members from and simultaneously with the reciprocations of the plunger.

9. In a stoker, the combination of a longitudinal retort and transverse branch retorts opening thereto at their inner ends the walls between the branch retorts providing air trunks and having twyers, and means for feeding fuel along the main and the branch retorts.

10. In a stoker, the combination of a charging ram, a longitudinal retort opening thereto and having lateral branch retorts extending therefrom, the walls between the branch retorts constituting air-trunks and having twyers along the branch-retort mouths, whereby the green fuel, underfed laterally to greater width than that of the main retort, is coked and burned in rather thin layer and combustion rate is increased.

11. In a stoker, the combination of a charging ram, a longitudinal retort opening thereto and having lateral branch retorts extending therefrom, the walls between the branch retorts constituting air-trunks and having twyers along the branch-retort mouths, and means supplementing said ram and located in the main retort for aiding the feed from the main retort along the branch-retorts.

12. In a stoker, the combination of a main longitudinal retort, lateral branch retorts extending therefrom, these branch-retorts down-sloping along their mouths and progressively decreasing in depth toward their outer ends, said retorts having air-supply twyers along their mouths, means for feeding fuel along the main and branch retorts and ash disposal means laterally beyond the branch-retort ends.

13. In a stoker, the combination of a main longitudinal retort, lateral branch retorts extending therefrom, these branch-retorts down-sloping along their mouths and progressively decreasing in depth toward their outer ends, said retorts having air-supply twyers along their mouths, means for feeding fuel along the main and branch retorts and open grates flanking the ends of the branch-retorts, whereby the fuel is underfed and coked throughout lateral areas greatly in excess of the main-retort width and fed with air through the fuel-mass when laterally beyond the retort-area.

14. A mechanical stoker having, in its firebox floor, a main longitudinal retort and two series of lateral branch retorts at substantially right angles thereto, the latter separated by walls forming air trunks and having twyers communicating with the air space below the floor, open grates flanking the ends of the lateral branch retorts and having air chambers therebelow, and means for regulating the supply of air to said chambers below the grates.

15. A mechanical stoker having a main retort, branch retorts leading laterally therefrom, and reciprocating means to feed fuel along the main retort, said means arranged to lift portions of the fuel bed, in reciprocating, to augment the feed along the branch retorts and tend to break up the live fuel-bed and minimize packing and clinkering.

HARRISON E. KLEFFEL.